United States Patent
Zhou et al.

(10) Patent No.: US 11,305,526 B2
(45) Date of Patent: Apr. 19, 2022

(54) SYSTEM AND CONTROL METHOD FOR EMBOSSED-IN-REGISTER OF SHEET

(71) Applicant: QINGDAO SANYI PLASTIC MACHINERY CO., LTD. (CN), Qingdao (CN)

(72) Inventors: Yuliang Zhou, Qingdao (CN); Chenggong Liu, Qingdao (CN)

(73) Assignee: QINGDAO SANYI PLASTIC MACHINERY CO., LTD. (CN), Qingdao (CN)

(*) Notice: Subject to any disclaimer, the term of this patent is extended or adjusted under 35 U.S.C. 154(b) by 0 days.

(21) Appl. No.: 17/241,825

(22) Filed: Apr. 27, 2021

(65) Prior Publication Data

US 2022/0032607 A1 Feb. 3, 2022

(30) Foreign Application Priority Data

Jul. 31, 2020 (CN) .......................... 202010758542.0

(51) Int. Cl.
*B41F 33/00* (2006.01)
*B41F 15/14* (2006.01)

(52) U.S. Cl.
CPC .......... *B41F 33/0081* (2013.01); *B41F 15/14* (2013.01)

(58) Field of Classification Search
CPC .............................. B41F 33/0081; B41F 15/14
See application file for complete search history.

(56) References Cited

U.S. PATENT DOCUMENTS 4,612,074 A * 9/1986 Smith .................. B29C 59/046
156/209
6,183,671 B1 * 2/2001 Stauffacher ............. B29C 59/04
264/132
(Continued)

FOREIGN PATENT DOCUMENTS

CN 103158415 B 6/2013
CN 107738394 A 2/2018
(Continued)

OTHER PUBLICATIONS

Search Report of the paralle application BR119035.
First Office Action of corresponding application KR1020210054551.

*Primary Examiner* — David H Banh
(74) *Attorney, Agent, or Firm* — J.C. Patents (57) ABSTRACT

A system and control method for embossed-in-register of a sheet is provided. The system comprises a printed film winding/releasing mechanism, a film laminating roller and a pattern roller spaced from the film laminating roller, wherein the printed film is provided with first identifiers at intervals, and the pattern roller is provided with second identifiers at intervals; the system further comprises: a color code sensing mechanism configured to detect the first identifiers, an encoder configured to detect a rotation position of the pattern roller, and a control system; the control system comprises a storage unit, a data acquisition unit and a control unit; wherein, the control unit is configured to calculate a deviation of a pattern position, corresponding to a current first identifier, of the printed film and a pattern position, corresponding to a current second identifier, of the pattern roller in a same pattern, and generating a control signal of the pattern roller based on the deviation. According to the present application, a high-precision adjustment signal of the pattern roller may be generated, an EIR effect is guar- (Continued)

anteed, the outturn percentage is increased, and the production cost is reduced.

9 Claims, 4 Drawing Sheets

(56) References Cited

U.S. PATENT DOCUMENTS

| | | | | |
|---|---|---|---|---|
| 6,277,230 | B1* | 8/2001 | Milko | B41F 19/062 |
| | | | | 156/230 |
| 8,316,764 | B1 | 11/2012 | Wu | |
| 2013/0078010 | A1* | 3/2013 | Inoue | G03G 15/0178 |
| | | | | 399/301 |
| 2013/0228946 | A1* | 9/2013 | Comerio | B29C 59/002 |
| | | | | 264/40.7 |
| 2015/0174638 | A1* | 6/2015 | Anguera | B65D 7/42 |
| | | | | 220/674 |
| 2017/0137196 | A1* | 5/2017 | Tinoco | B31D 1/026 |
| 2017/0297257 | A1* | 10/2017 | Kackmann-Schneider | |
| | | | | B32B 3/30 |
| 2018/0025185 | A1* | 1/2018 | Hattrup | G06K 15/1859 |
| | | | | 235/375 |

FOREIGN PATENT DOCUMENTS

| | | |
|---|---|---|
| CN | 109940867 B | 6/2019 |
| KR | 1020180135037 | 12/2018 |

* cited by examiner

SYSTEM AND CONTROL METHOD FOR EMBOSSED-IN-REGISTER OF SHEET

The present application claims priority to the Chinese Patent Application No. 202010758542.0, filed on Jul. 31, 2020 and entitled "SYSTEM AND CONTROL METHOD FOR EMBOSSED-IN-REGISTER OF SHEET", the entire contents of which are incorporated herein by reference.

TECHNICAL FIELD

The present application relates to the technical field of sheet processing and in particular to a system and control method for embossed-in-register of a sheet.

BACKGROUND

Different colors of a sheet are achieved by laminating different color films. In order to enhance a sense of reality, the sheet may also be printed and embossed by a pattern roller. To improve beauty of the sheet, patterns of the color film laminated onto the sheet are required to be superimposed with surface textures embossed by the pattern roller, that is, an embossed-in-register (EIR) technology.

Sheet processing in the prior art is realized by adopting the following solution.

A base material of a plastic floor is produced by an extrusion line or internal mixer, next, the color films are artificially placed one by one, then, hot pressing lamination is performed by using a pressing machine, and therefore, the sheet processing is low in production efficiency, high in energy consumption, low in finished product rate and poor in texture.

As an improvement of the above-mentioned sheet processing method, a synchronous printing and film laminating technology is capable of realizing online synchronous embossing by virtue of an extruder and has the advantages that a synchronously-embossed plastic floor may be produced on line, the production efficiency is effectively increased, and the energy consumption is reduced. However, the EIR precision which may be achieved by adopting the solution in the prior art is finite, so that the processing efficiency and the finished product rate of the sheet are affected.

SUMMARY

A purpose of the present application is to improve the above-mentioned technical problem and provide a sheet processing technology.

In order to achieve the above-mentioned purpose, a system for EIR of a sheet is provided in some embodiments of the present application. The system comprises a printed film winding/releasing mechanism for winding/releasing a printed film, a film laminating roller for assistance in lamination of the printed film and a pattern roller spaced from the film laminating roller, wherein the printed film is provided with first identifiers at intervals, and the pattern roller is provided with second identifiers at intervals; the system further comprises:

a color code sensing mechanism, disposed on a release path of the printed film and configured to detect the first identifiers;

an encoder, disposed on the pattern roller and configured to detect a rotation position of the pattern roller; and a control system comprising:

a storage unit, configured to store pattern positions, each corresponding to one of the first identifiers, of the printed film and pattern positions, each corresponding to one of the second identifiers, of the pattern roller;

a data acquisition unit, configured to acquire a color code detection signal of the color code sensing mechanism and a position signal, detected by the encoder, of the pattern roller; and a control unit, configured to acquire a current first identifier of the printed film and a current second identifier of the pattern roller based on information detected by the color code sensing mechanism and the encoder, calculate a deviation of a pattern position, corresponding to the current first identifier, of the printed film and a pattern position, corresponding to the current second identifier, of the pattern roller in a same pattern, and generating a control signal of the pattern roller based on the deviation.

In some embodiments of the present application, the first identifiers are equally-divided identifiers, disposed in a length direction of the printed film;

the storage unit is configured to sequentially number the first identifiers within a pattern period of the printed film and store patterns corresponding to numbers, respectively; and the control unit is configured to count a first identifier detected every time and find a number and a pattern corresponding to the number according to the count.

In some embodiments of the present application, the second identifiers are equally-divided identifiers, disposed in a circumferential direction of the pattern roller and corresponding to the equally-divided identifiers of the printed film, of the pattern roller.

In some embodiments of the present application, the printed film is further provided with third identifiers at intervals, a distance between two of the adjacent third identifiers corresponds to one pattern period of the printed film, and the color code sensing mechanism is further configured to detect the third identifiers; and the control unit is further configured to return the count of the first identifiers to zero after detecting a third identifier every time based on information detected by the color code sensing mechanism.

In some embodiments of the present application, the first identifiers and the third identifiers are respectively disposed at two sides of the printed film in the length direction of the printed film; and the color code sensing mechanism comprises a first color code sensor for detecting number of signals of the first identifiers and a second color code sensor for detecting the third identifiers, the first color code sensor is disposed at a side where the first identifiers are located, and the second color code sensor is disposed at the other side where the third identifiers are located.

In some embodiments of the present application, a circumference of the pattern roller is 104%-115% of a circumference of a printing stencil; and the circumference of the printing stencil is a length corresponding to a repetition period of patterns of the printed film.

In some embodiments of the present application, the system further comprises a deviation correcting device disposed on the release path of the printed film.

In some other embodiments of the present application, provided is a control method for EIR, in which the above-mentioned system for EIR is utilized. The control method comprises:

disposing first identifiers on a printed film, and recording pattern positions, each corresponding to one of the first identifiers, of the printed film;

disposing second identifiers on a pattern roller, and recording pattern positions, each corresponding to one of the second identifiers, of the pattern roller, wherein the second identifiers correspond to the first identifiers;

comparing a deviation of a pattern position, corresponding to a current first identifier, of the printed film and a pattern position, corresponding to a current second identifier, of the pattern roller in a same pattern at the same moment based on a detected first identifier and a detected second identifier; and generating a speed control solution of the pattern roller based on a value of the deviation to adjust a rotating speed of the pattern roller so as to reduce a difference of the positions of the printed film and the pattern roller acted on a blank.

In some embodiments of the present application, the control method further comprises:

acquiring a first deviation value based on comparison of a pattern position of the printed film and a pattern position of the pattern roller in a same pattern at a first moment;

acquiring a second deviation value based on comparison of a pattern position of the printed film and a pattern position of the pattern roller in a same pattern at a second moment;

comparing the first deviation value with the second deviation value to acquire a synchronous adjustment tendency; and judging whether the speed control solution of the pattern roller is reasonable based on a synchronous adjustment tendency, and adjusting a control signal.

In some embodiments of the present application, the control method further comprises:

if the second deviation value is smaller than the first deviation value, further adopting the current adjustment solution, or adjusting the control signal for the pattern roller to change the deviation from rapid reduction to relatively slow reduction, so as to avoid over-adjustment; and if the second deviation value is greater than the first deviation value, proving that over-adjustment has happened at present, and adopting an opposite control signal for adjustment. In some embodiments of the present application, the method further comprises: when detecting third identifiers, counting the first identifiers from 1.

Compared with a similar product in the prior art, the system and control method for EIR, provided by the present application, have the beneficial effects:

(1) according to the system and control method for EIR, provided by the present application, the printed film and the pattern roller are provided with identifiers, the deviations of the patterns of the printed film and the patterns of the pattern roller are calculated, and the roller speed is adjusted in real time according to the deviations, so that the EIR precision is improved, the sheet processing efficiency and the finished product rate are guaranteed, and a sheet achieves a better beautiful effect;

(2) according to the system and control method for EIR, provided by the present application, the printed film and the pattern roller are equally divided and marked, and a high-precision adjustment signal of the pattern roller may be generated by comparing the deviation of the pattern of the printed film and the pattern of the pattern roller on the same position at the same time within the range of a relatively small measurement unit, so that the outturn percentage is guaranteed, and the production cost is reduced; and (3) according to the system and control method for EIR, provided by the present application, the deviations of the pattern positions of the printed film and the pattern positions of the pattern roller at different moments are calculated to acquire the synchronous adjustment tendency, whether the adjustment solution is reasonable is judged, and the control signal is adjusted in real time, so that the control precision is further improved.

wherein:

1—film laminating roller; 2—pattern roller; 201—second identifier; 3—first calendering roller; 4—second calendering roller; 5—printed film winding/releasing mechanism; 6—wear-resistant film winding/releasing mechanism; 7—printed film; 701—first identifier; 702—third identifier; 8—color code sensing mechanism; 9—deviation correcting device; 10—blank; 11—encoder; 12—control system; 121—storage unit; 122—data acquisition unit; and 123—control unit.

DETAILED DESCRIPTION

In order to make technical problems to be solved, technical solutions and beneficial effects of the present application clearer, the present application will be further described in detail below in conjunction with the accompanying drawings and embodiments. It should be understood that specific embodiments described herein are merely intended to explain the present application, rather than to limit the present application.

It should be noted that when an element is referred to as being "disposed on" another element, it can be directly or indirectly on another element. When an element is referred to as being "connected to" another element, it can be directly or indirectly connected to another element.

Terms "first", "second", "third" and "fourth" are merely for the purpose of description, but are not used for indicating the relative importance.

The "sheet" in the present application particularly refers to a floor.

The technical solutions provided by the present application are used for sheet processing and are specifically used for enabling embossing textures to correspond to patterns of printed film (they are superimposed as much as possible) during sheet processing, so that a better visual effect is achieved.

Figure 1:
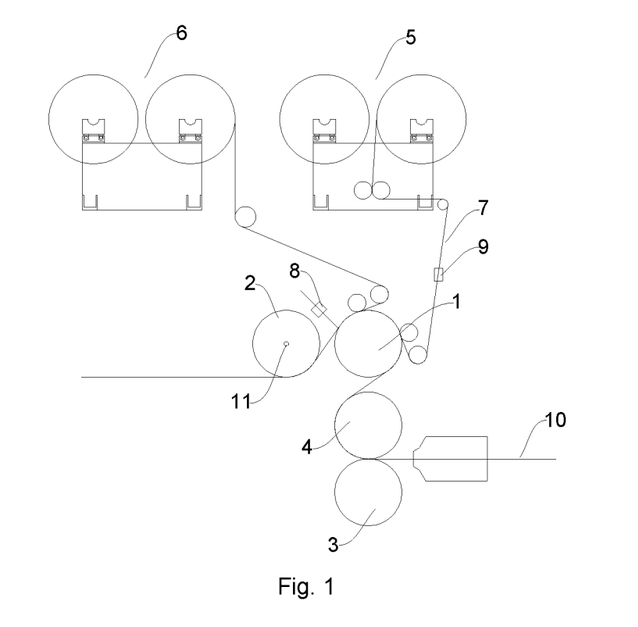
FIG. 1 is a schematic diagram showing a structure of a system for EIR, provided by an embodiment of the present application.

A calender and assemblies used during sheet processing comprise the following structures as shown in FIG. 1.

A front end mechanism comprises an extruder, a mould and the like and is configured to extrude a blank 10 of the sheet and preliminarily shaping the blank 10. The front end mechanism is not shown in FIG. 1.

A calender may be provided with a plurality of sets of calendering rollers according to a processing demand, and a discharging end of the mould is located at a feeding end of a first set of calendering rollers. The blank 10 is calendered and modified by the calendering rollers. In the present embodiment, as shown in FIG. 1, the calender comprises a first calendering roller 3, a second calendering roller 4, a third calendering roller and a fourth calendering roller according to a sheet processing direction. The blank 10 enters the calender through a gap located between the first calendering roller 3 and the second calendering roller 4. The third calendering roller is a film laminating roller 1, and the fourth calendering roller is a pattern roller 2, wherein the film laminating roller 1 is configured to laminate a film on a surface of the blank 10, and the pattern roller 2 is configured to emboss the film laminated surface.

A film laminating mechanism generally comprises a printed film winding/releasing mechanism 5 and a wear-resistant film winding/releasing mechanism 6. The printed film winding/releasing mechanism 5 is configured to wind/release a printed film 7, and the printed film 7 is guided to a front end of the film laminating roller 1 and is laminated on the blank 10. The wear-resistant film winding/releasing mechanism 6 is configured to wind/release a wear-resistant film, and the wear-resistant film is laminated on the printed film 7 to improve the wear-resistant effect of the sheet. In some embodiments, the wear-resistant film may be omitted as required, and accordingly, the wear-resistant film winding/releasing mechanism 6 may also be omitted.

Patterns of the printed film 7 correspond to (same with) patterns of the pattern roller 2. During sheet processing, the printed film 7 and the pattern roller 2 may be replaced according to different pattern demands. The patterns on the printed film 7 are periodically and repeatedly disposed, and a pattern period of the printed film 7 corresponds to the patterns at a periphery of the pattern roller 2.

Figure 4:
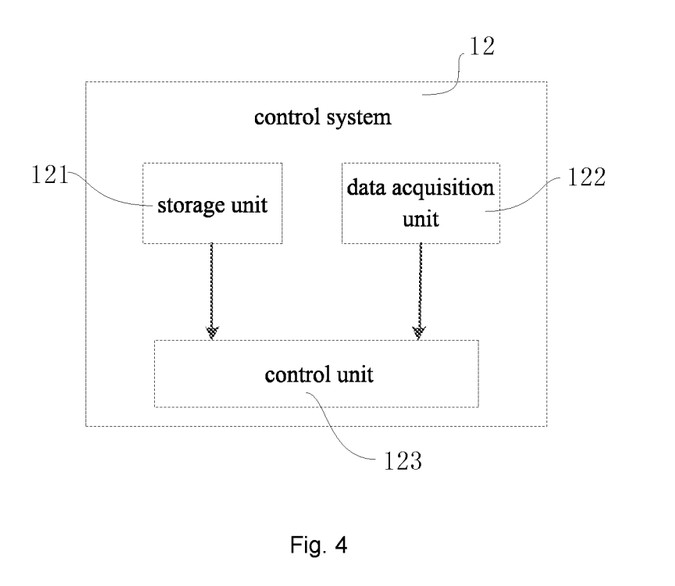
FIG. 4 is a schematic diagram of a control system in the system for EIR, provided by the embodiment of the present application.

In order to improve the beautiful effect, the patterns of the printed film 7 laminated on the blank 10 are required to be superimposed as much as possible with textures embossed on a surface of the printed film by the pattern roller 2. For this purpose, a system for EIR of the sheet, provided by an embodiment of the present application, comprises the printed film winding/releasing mechanism 5 for winding/releasing the printed film 7, the film laminating roller 1 for assistance in lamination of the printed film 7 and the pattern roller 2 spaced from the film laminating roller 1; and the printed film 7 is provided with first identifiers 701 (referring to FIG. 2) at intervals, and the pattern roller 2 is provided with second identifiers 201 (referring to FIG. 3) at intervals. As shown in FIG. 1, the system further comprises:

a color code sensing mechanism 8, disposed on a release path of the printed film 7, located between the film laminating roller 1 and the pattern roller 2 and configured to detect the first identifiers 701;

an encoder 11, disposed on the pattern roller 2 and configured to detect a rotation position of the pattern roller 2; and a control system 12 (as shown in FIG. 4) comprising:

a storage unit 121, configured to store pattern positions, each corresponding to one of the first identifiers 701, of the printed film 7 and pattern positions, each corresponding to one of the second identifiers 201, of the pattern roller 2;

a data acquisition unit 122, configured to acquire a color code detection signal of the color code sensing mechanism 8 and a position signal, detected by the encoder 11, of the pattern roller 2, wherein the above-mentioned signals are further transmitted to a control unit 123; and the control unit 123, configured to acquire a current first identifier 701 of the printed film 7 and a current second identifier 201 of the pattern roller 2 based on information detected by the color code sensing mechanism 8 and the encoder 11, calculate a deviation of a pattern position, corresponding to the current first identifier 701, of the printed film 7 and a pattern position, corresponding to the current second identifier 201, of the pattern roller 2 in the same pattern, and generate a control signal of the pattern roller 2 based on the deviation.

Figure 5:
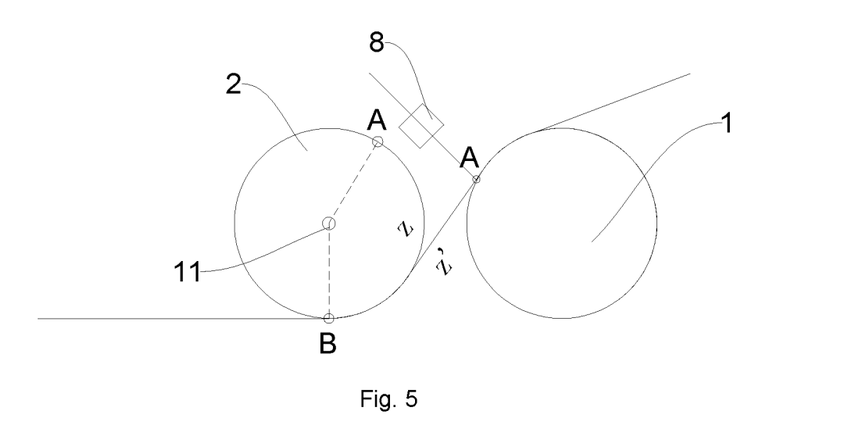
FIG. 5 is a working schematic diagram of the system for EIR, provided by the embodiment of the present application.

Herein, it can be understood that, referring to FIG. 1, the blank 10 is laminated with the printed film 7 by virtue of the film laminating roller 1 and is then embossed by virtue of the pattern roller 2, and therefore, for the same pattern, an embossing process is lagged as comparison with a film laminating process at a certain moment. Referring to FIG. 5, in the description of the above-mentioned control unit 123, the current first identifier 701 of the printed film 7 refers to a first identifier 701 detected by the color code sensing mechanism 8, and a pattern position corresponding to the first identifier 701 is defined as A; and thus, the current second identifier 201 of the pattern roller 2 refers to a second identifier 201 corresponding to the pattern position A at the periphery of the pattern roller 2 within the current pattern period (the second identifier has not been embossed at the moment). That is, the above-mentioned deviation refers to a position deviation of the first identifier 701 of the printed film 7 and the second identifier 201 of the pattern roller 2 on the same pattern position A. It should be noted that the position deviation is not an actual distance from the printed film 7 to the pattern roller 2, but is a precalculated deviation of the pattern position A on the pattern roller 2 and the pattern position A on the printed film 7 on the surface of the blank 10 when the surface of the blank 10 is embossed by the pattern position A on the pattern roller 2, based on positions where the printed film 7 and the pattern roller 2 are located at present.

By using the system for EIR, provided by the above-mentioned embodiment, the patterns of the printed film may be superimposed with embossing textures as much as possible in film laminating and embossing processes, so that an EIR effect is guaranteed, the outturn percentage is increased, and the production cost is reduced.

A working process of the system is described as follows in conjunction with FIG. 5.

In the working process of the system for EIR in the present embodiment, a starting point of a pattern period is defined as a zero point, the printed film 7 is laminated to the surface of the blank 10 by the film laminating roller 1, and the zero point of the printed film 7 corresponds to (is superimposed with) the zero point of the pattern roller 2. As shown in FIG. 5, with travelling of the blank 10, the color code sensing mechanism 8 detects a first identifier 701 of the printed film 7, a pattern position corresponding to the first identifier 701 is defined as A, and the information is transmitted to the control unit 123 by the data acquisition unit 122; at the moment, the encoder 11 detects a rotation position (such as an angle or arc length rotating relative to the zero point) of the pattern roller 2 and transmits the information to the control unit 123 by virtue of the data acquisition unit 122; and the control unit 123 acquires the current second identifier 201, corresponding to the pattern position A within the current pattern period, of the pattern roller 2 according to image information, stored by the storage unit 121, of the pattern roller 2, calculates an embossing position B of the pattern roller 2 at the moment according to the rotation position of the pattern roller 2 and a distance z (representing the pattern position, corresponding to the current second identifier 201, of the pattern roller 2) from the position B to the pattern position A (the current second identifier 201) at the periphery of the pattern roller 2, compares the distance z with a distance z' (representing the pattern position, corresponding to the current first identifier 701, of the printed film 7) from the position B to a pattern position A (the current first identifier 701) on the printed film 7, and adjusts a rotating speed of the pattern roller 2 according to a difference of z and z', so that the pattern A on the printed film 7 is superimposed with the pattern A at the periphery of the pattern roller 2 as much as possible.

Figure 2:
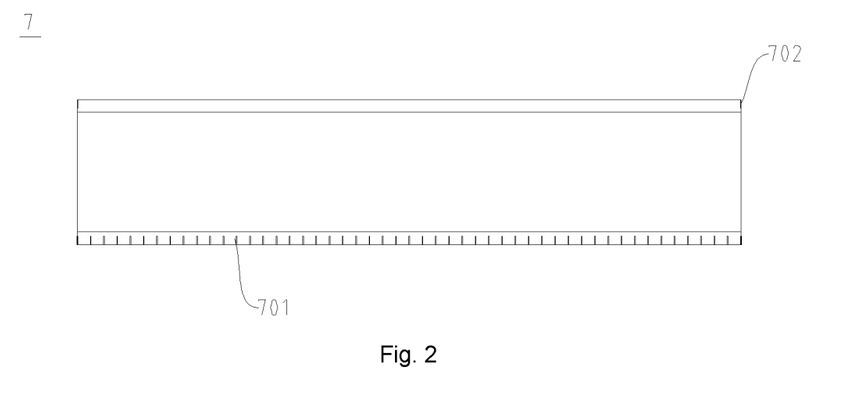
FIG. 2 is a schematic diagram showing first identifiers and third identifiers of a printed film provided by an embodiment of the present application.
Figure 3:
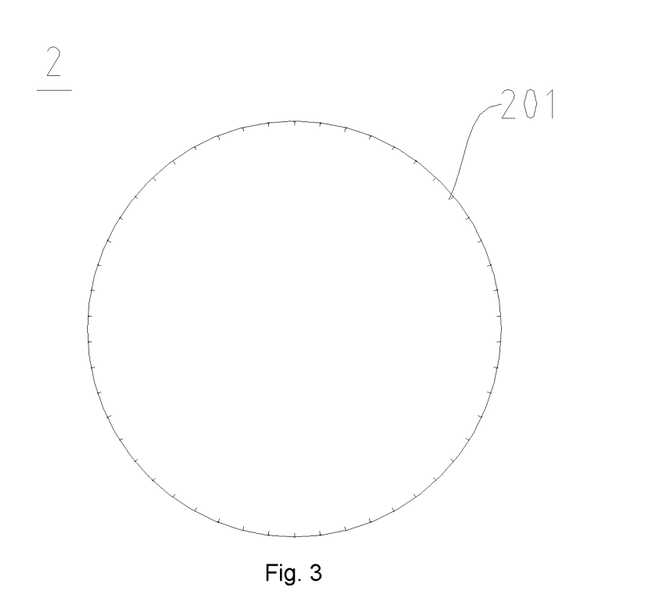
FIG. 3 is a schematic diagram showing second identifiers of a pattern roller provided by an embodiment of the present application.

Preferably, as shown in FIG. 2, the first identifiers 701 are equally-divided identifiers disposed on an edge of one side of the printed film 7 and are generally 30-80 equally-divided identifiers in a pattern period of the printed film according to a processing demand. Referring to FIG. 3, the second identifiers 201 are equally-divided identifiers disposed along a circumference of the pattern roller 2 and are disposed to correspond to the first identifiers 701. For example, if the first identifiers 701 adopt 30 equally-divided identifiers in the pattern period of the printed film, the second identifiers 201 also adopt 30 equally-divided identifiers in the circumference of the pattern roller 2.

Specifically, there are a plurality of the first identifiers 701. For example, the pattern period of the printed film is equally divided into 30, there are 30 first identifiers 701, and a last first identifier 701 in a previous period coincides with a first identifier 701 in a next period. In this way, for different pattern periods of the printed film, the patterns, corresponding to equally-divided positions (the first identifiers 701) on the same position, of the printed film are consistent. Similarly, for different periods of the pattern roller 2, the patterns, corresponding to equally-divided positions (the second identifiers 201) on the same position, of the pattern roller are consistent.

As an implementation way, the storage unit 121 is configured to sequentially number the first identifiers 701 within a pattern period of the printed film 7 and store patterns corresponding to all numbers. The control unit 123 is configured to count detection signals of the first identifiers 701 in a numbering way, number the first identifier 701 detected every time and find the number in the storage unit 121 and the pattern corresponding to the number.

Further, the pattern position, corresponding to the current first identifier 701, of the printed film 7 and the pattern position, corresponding to the current second identifier 201, of the pattern roller 2 in the same pattern may be calculated based on a setting position of the color code sensing mechanism 8 and the rotation position, detected by the encoder 11, of the pattern roller 2, then, the deviation of the two pattern positions is calculated, and a rotation control signal of the pattern roller 2 is generated based on the deviation, so that the rotating speed of the pattern roller 2 is driven to be changed; and the speed of the pattern roller 2 is adjusted to reduce a difference of the positions of the printed film 7 and the pattern roller 2 acted on the blank 10, that is, a deviation of the patterns of the printed film 7 and the embossing textures of the pattern roller 2 acted on the blank 10 is reduced.

Specifically, at an initial stage of film lamination, the position of the color code sensing mechanism 8 is recorded in the control unit 123; an initial rotation position of the pattern roller 2 is recorded by the encoder 11 and is acquired and recorded in the control unit 123; and signals of the printed film 7 are continuously detected by the color code sensing mechanism 8 in a moving process of the printed film 7 and are counted by the control system 12. An image of the printed film 7 is acquired to the control unit 123, and the control unit 123 is capable of calculating the corresponding pattern position (denoted with z' in FIG. 5) of the printed film at the moment based on an initial counting position and a current counting position of the first identifiers 701; and an initial pointing position and a current pointing position of the encoder 11 are recorded in the control system 12, and the control system 12 is capable of calculating the pattern position (denoted with z in FIG. 5), corresponding to the pattern position of the printed film at present, of the pattern roller 2 based on a rotation direction of the pattern roller 2 in combination with the information detected by the encoder 11. A difference of an embossing pattern position of the pattern roller 2 and a film laminating pattern position of the printed film 7 is reflected as a difference of the pattern position of the printed film 7 and the pattern position of the pattern roller 2 at present (that is, a difference of z and z'), and a malposition difference may be adjusted by adjusting the rotating speed of the pattern roller 2 until the patterns of the printed film 7 correspond to the embossing textures of the pattern roller 2.

In some embodiments of the present application, preferably, as shown in FIG. 2, the printed film 7 is further provided with third identifiers 702 at intervals, a distance between two of the adjacent third identifiers 702 corresponds to a pattern period of the printed film 7, and the color code sensing mechanism 8 is further configured to detect the third identifiers 702. The control unit 123 is further configured to return the count of the first identifiers 701 to zero after detecting a third identifier 702 every time based on information detected by the color code sensing mechanism 8. For example, the pattern period of the printed film is equally divided into 30, when one of the third identifiers 702 is detected, the first identifiers 701 are numbered from 1, and corresponding information of numbers and patterns are stored.

Furthermore, as shown in FIG. 2, the first identifiers 701 and the third identifiers 702 are respectively disposed at two sides of the printed film 7 in a length direction of the printed film 7; and preferably, the identifiers adopted as the third identifiers 702 are cutting identifiers printed on the printed film 7. The color code sensing mechanism 8 comprises a first color code sensor for detecting the first identifiers 701 and a second color code sensor for detecting the third identifiers 702, and the second color code sensor is disposed in parallel with the first color code sensor, which is not shown in FIG. 1. The first color code sensor is disposed at a side where the first identifiers 701 are located, and the second color code sensor is disposed at the other side where the third identifiers 702 are located. Data detected by the two color code sensors is respectively transmitted to the control system 12; and when the control system 12 detects a third identifier 702 for the first time, the first identifier 701 adjacent to the third identifier 702 is determined as identifier #1, and the subsequently detected first identifiers 701 are sequentially numbered.

In some embodiments of the present application, the circumference of the pattern roller 2 is 104%-115% of a circumference of a printing stencil; and the circumference of the printing stencil is a length corresponding to a repetition period of the patterns of the printed film 7. Further, the circumference of the pattern roller 2 is preferably 106%-110% of the circumference of the printing stencil and is further preferred as 108% of the circumference of the printing stencil according to different types of textures and different embossing depths. Due to the adoption of such a solution in which a corresponding relationship between a expansion rate and the patterns of the printed film during processing is taken into consideration, the executability of EIR may be favorably guaranteed.

In other words, in the above-mentioned embodiment, the patterns at the periphery of the pattern roller 2 are formed after stretching by 104%-115% based on patterns of the printing stencil. It can be understood that the above-mentioned expansion rate is also taken into consideration in the above-mentioned process that z and z' are compared.

In some embodiments of the present application, the system further comprises a deviation correcting device 9 disposed on the release path of the printed film. The deviation correcting device 9 adopts an automatic deviation corrector to avoid release deviation of the printed film 7.

Another embodiment of the present application provides a control method for EIR, by which patterns of a printed film 7 are superimposed with embossing textures as much as possible by virtue of the above-mentioned system for EIR.

Figure 6:
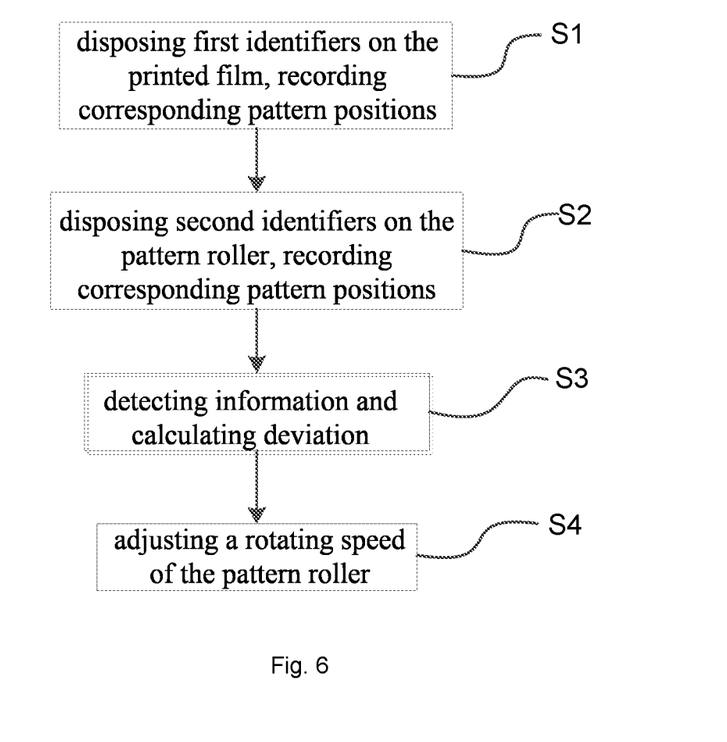
FIG. 6 is a first flow diagram of a control method for EIR, provided by an embodiment of the present application.

As shown in FIG. 6, the control method for EIR comprises:

S1: first identifiers 701 are disposed on a printed film 7, and pattern positions, each corresponding to one of the first identifiers 701, of the printed film 7 are recorded;

S2: second identifiers 201 are disposed on a pattern roller 2, and pattern positions, each corresponding to one of the second identifiers 201, of the pattern roller 2 are recorded, wherein the second identifiers 201 correspond to the first identifiers 701;

S3: a deviation of a pattern position, corresponding to a current first identifier, of the printed film 7 and a pattern position, corresponding to a current second identifier 201, of the pattern roller 2 in the same pattern at the same moment is compared based on the detected first identifier 701 and second identifier 201; and S4: a speed control solution of the pattern roller 2 is generated based on a value of the deviation to adjust a rotating speed of the pattern roller so as to reduce a difference of the positions of the printed film 7 and the pattern roller 2 acted on a blank 10.

In a process of adjusting the speed of the pattern roller 2, the color code sensing mechanism 8 and the encoder 11 continuously feed back corresponding detection values to the control system 12, and furthermore, a position deviation adjusting result may be acquired in real time.

As a preferred implementation way, the first identifiers 701 within a pattern period of the printed film 7 are sequentially numbered, and positions corresponding to patterns are stored according to the numbers; in order to facilitate counting, more preferably, the first identifiers 701 are disposed on equally-divided positions; the second identifiers 201 within the circumference of the pattern roller 2 are sequentially numbered, and positions corresponding to patterns are stored according to the numbers; and more preferably, the second identifiers 201 are disposed on equally-divided positions of the circumference.

As a preferred implementation way, the control method further comprises:

the printed film 7 is further provided with third identifiers 702 at intervals, and a distance between two of the adjacent third identifiers 702 corresponds to a pattern period of the printed film 7; and in the above-mentioned detection process of the first identifiers 701, after one of the third identifiers 702 is detected, the first identifiers 701 are counted from 1, and a new round of information calling of the first identifiers 701 is started.

Figure 7:
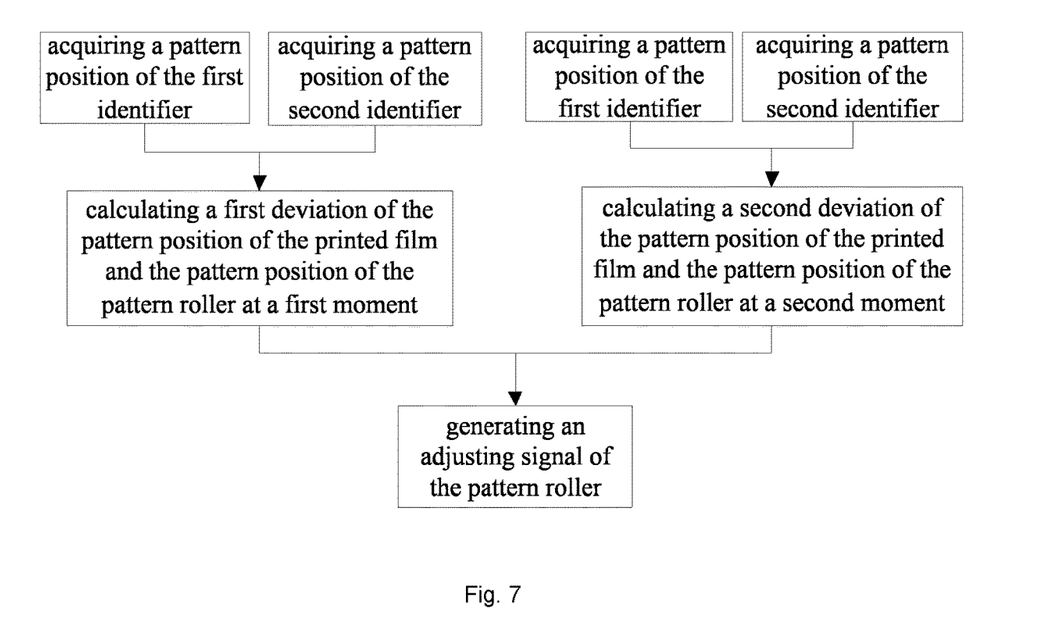
FIG. 7 is a second flow diagram of a control method for EIR, provided by an embodiment of the present application.

Furthermore, in some embodiments of the present application, in order to more precisely adjust the above-mentioned position deviation, the control solution of the pattern roller 2 is adjusted based on a real-time comparison result of the position deviation. As shown in FIG. 7, the control method further comprises:

a first deviation value, that is, a deviation of z and z' at a first moment, is acquired based on comparison of a pattern position of the printed film 7 and a pattern position of the pattern roller 2 in the same pattern at a first moment;

a second deviation value, that is, a deviation of z and z' at a second moment, is acquired based on comparison of a pattern position of the printed film 7 and a pattern position of the pattern roller 2 in the same pattern at a second moment;

the second deviation value is compared with the first deviation value to acquire a synchronous adjustment tendency; and whether the adjustment solution is reasonable is judged based on the synchronous adjustment tendency, and then a control signal is adjusted. Specifically, at the first moment, data fed back to the control unit 123 is the first deviation value of a pattern position, corresponding to a first detection result of the first identifiers 701, of the first identifiers and a first pattern position of the pattern roller at the moment, at the moment, the control system 12 has generated a rotation adjustment signal of the pattern roller 2 based on the first deviation value; and at the second moment, data fed back to the control unit 123 is the second deviation value of a pattern position, corresponding to a second detection result of the first identifiers 701, of the first identifiers and a second pattern position of the pattern roller at the moment, the second deviation value is obtained after adjustment, so that it can embody an adjustment tendency which may be achieved by adopting the current control signal for the pattern roller 2, in other words, a difference of position signals acquired at the two moments is capable of reflecting whether the adjustment solution is reasonable, and a control terminal is capable of adjusting the control signal with reference to such an adjustment tendency. For example, if the current control signal for the pattern roller 2 is reasonable and the second deviation value is reduced as comparison with the first deviation value, the current adjustment solution may be further adopted; furthermore, the control signal for the pattern roller 2 may also be adjusted, and the deviation is adjusted from rapid reduction to relatively slow reduction so as to avoid over-adjustment; and if over-adjustment has happened at present, an opposite control signal is required to be adopted for adjustment. The solution is beneficial to the real-time adjustment of the adjustment solution of the pattern roller, so that a required adjustment solution may be achieved as soon as possible.

According to the EIR solution provided by the present application, the printed film 7 and the pattern roller 2 are equally divided and marked, a high-precision adjustment signal of the pattern roller 2 may be generated by comparing the deviation of the pattern position of the printed film 7 and the pattern position of the pattern roller 2 with the same pattern at the same time within the range of a relatively small measurement unit, and the control signal of the pattern roller 2 may be adjusted in time based on deviation comparison results acquired at continuous moments, so that the patterns of the printed film and the patterns of the pattern roller are tracked in time and precisely synchronized, the outturn percentage is guaranteed, and the production cost is reduced.

The above descriptions are merely the preferred embodiments of the present application, but are not intended to limit the present application. Any modifications, equivalent replacements, improvements and the like made within the spirit and principle of the present application shall fall within the protective scope of the present application.

The invention claimed is:

1. A system for embossed-in-register of a sheet, comprising a printed film winding/releasing mechanism for winding/releasing a printed film, a film laminating roller for assistance in lamination of the printed film and a pattern roller spaced from the film laminating roller, wherein the printed film is provided with first identifiers at intervals, and the pattern roller is provided with second identifiers at intervals; the system further comprises:

a color code sensing mechanism, disposed on a release path of the printed film and configured to detect the first identifiers;

an encoder, disposed on the pattern roller and configured to detect a rotation position of the pattern roller; and a control system comprising:

a storage unit, configured to store pattern positions, each corresponding to one of the first identifiers, of the printed film and pattern positions, each corresponding to one of the second identifiers, of the pattern roller;

a data acquisition unit, configured to acquire a color code detection signal of the color code sensing mechanism and a position signal, detected by the encoder, of the pattern roller; and a control unit, configured to acquire a current first identifier of the printed film and a current second identifier of the pattern roller based on information detected by the color code sensing mechanism and the encoder, calculate a deviation of a pattern position, corresponding to the current first identifier, of the printed film and a pattern position, corresponding to the current second identifier, of the pattern roller in a same pattern, and generating a control signal of the pattern roller based on the deviation;

wherein, the first identifiers are equally-divided identifiers disposed in a length direction of the printed film;

the storage unit is configured to sequentially number the first identifiers within a pattern period of the printed film and store patterns corresponding to numbers, respectively; and the control unit is configured to count a first identifier detected every time and find a number and a pattern corresponding to the number according to the count.

2. The system according to claim 1, wherein, the second identifiers are equally-divided identifiers, disposed in a circumferential direction of the pattern roller and corresponding to the equally-divided identifiers of the printed film, of the pattern roller.

3. The system according to claim 1, wherein, the printed film is further provided with third identifiers at intervals, a distance between two of the adjacent third identifiers corresponds to one pattern period of the printed film, and the color code sensing mechanism is further configured to detect the third identifiers; and the control unit is further configured to return the count of the first identifiers to zero after detecting a third identifier every time based on information detected by the color code sensing mechanism.

4. The system according to claim 3, wherein, the first identifiers and the third identifiers are respectively disposed at two sides of the printed film in the length direction of the printed film; and the color code sensing mechanism comprises a first color code sensor for detecting number of signals of the first identifiers and a second color code sensor for detecting the third identifiers, the first color code sensor is disposed at a side where the first identifiers are located, and the second color code sensor is disposed at the other side where the third identifiers are located.

5. The system according to claim 1, wherein, a circumference of the pattern roller is 104%-115% of a circumference of a printing stencil; and the circumference of the printing stencil is a length corresponding to a repetition period of patterns of the printed film.

6. The system according to claim 1, wherein, the system further comprises a deviation correcting device disposed on the release path of the printed film.

7. A control method for embossed-in-register, using the system for embossed-in-register according to claim 1, comprising:

disposing first identifiers on a printed film, and recording pattern positions, each corresponding to one of the first identifiers, of the printed film;

disposing second identifiers on a pattern roller, and recording pattern positions, each corresponding to one of the second identifiers, of the pattern roller, wherein the second identifiers correspond to the first identifiers;

comparing a deviation of a pattern position, corresponding to a current first identifier, of the printed film and a pattern position, corresponding to a current second identifier, of the pattern roller in a same pattern at the same moment based on a detected first identifier and a detected second identifier; and generating a speed control solution of the pattern roller based on a value of the deviation to adjust a rotating speed of the pattern roller so as to reduce a difference of the positions of the printed film and the pattern roller acted on a blank.

8. The control method according to claim 7, wherein, further comprises:

acquiring a first deviation value based on comparison of a pattern position of the printed film and a pattern position of the pattern roller in a same pattern at a first moment;

acquiring a second deviation value based on comparison of a pattern position of the printed film and a pattern position of the pattern roller in a same pattern at a second moment;

comparing the first deviation value with the second deviation value to acquire a synchronous adjustment tendency; and judging whether the speed control solution of the pattern roller is reasonable based on a synchronous adjustment tendency, and adjusting a control signal.

9. The control method according to claim 8, wherein, further comprises:

if the second deviation value is smaller than the first deviation value, further adopting the current adjustment solution, or adjusting the control signal for the pattern roller to change the deviation from rapid reduction to relatively slow reduction, so as to avoid over-adjustment; and if the second deviation value is greater than the first deviation value, proving that over-adjustment has happened at present, and adopting an opposite control signal for adjustment.

* * * * *